United States Patent Office 2,694,083
Patented Nov. 9, 1954

2,694,083

TRI-(FLUORALKYL PHENYL) PHOSPHATES AND METHOD FOR PRODUCING THEM

Douglas H. Moreton, Pacific Palisades, and Bertram Keilin, Santa Monica, Calif., assignors to Douglas Aircraft Company, Inc., Santa Monica, Calif.

No Drawing. Application February 20, 1950, Serial No. 145,311

16 Claims. (Cl. 260—461)

This invention relates to certain tri-(fluoralkyl phenyl) phosphates and to a method for producing them.

We have discovered that certain tri-(trifluoralkyl phenyl)phosphates can not only be made in accordance with the process of our invention but also that these chemical compounds have surprising and advantageous properties. These phosphates particularly include the tri-(fluoralkyl phenyl) phosphates in which the end carbon atom of the alkyl group has three fluorine atoms and the alkyl group from one to four carbon atoms in the o-, m-, or p- positions. These compositions have a combination of properties making them useful to a surprising degree as fire resistant or relatively non-flammable heat transfer fluids, functional fluids or lubricants. The tri-(trifluoralkyl phenyl) phosphates of my invention particularly include tri-(m-trifluormethyl phenyl) phosphate and tri-(meta-2,2,2-trifluorethyl phenyl) phosphate.

The following specific example relating to tri-(m-trifluormethyl phenyl) phosphate will illustrate and exemplify our invention.

Example 161 grams of meta-trifluormethyl aniline was reached with 70 grams of sodium nitrite in the presence of 220 ml. of concentrated sulfuric acid at about 0–5° C. to effect diazotization and produce meta-trifluormethyl phenyl diazonium sulfate as indicated by the following equation:

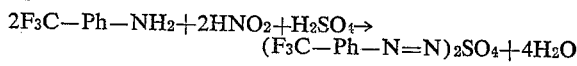

$$2F_3C-Ph-NH_2+2HNO_2+H_2SO_4 \rightarrow (F_3C-Ph-N\!=\!N)_2SO_4+4H_2O$$

The solution containing the meta-trifluormethyl phenyl diazonium sulfate was heated with boiling water and sulphuric acid to drive off nitrogen and replace the diazo group with a hydroxyl group as indicated by the following:

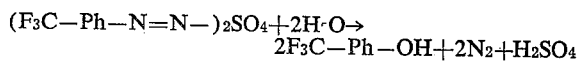

$$(F_3C-Ph-N\!=\!N-)_2SO_4+2H\cdot O \rightarrow 2F_3C-Ph-OH+2N_2+H_2SO_4$$

200 grams of the liquid meta-trifluormethyl phenol was then reacted with phosphorus oxy-chloride (POCl$_3$) by stirring for two hours at room temperature and for 36 hours at 100° C. until evolution of HCl gas had ceased. This process produced the desired new chemical compound tri-(meta-trifluoralkyl phenyl) phosphate as indicated by the following equation:

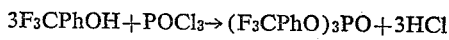

$$3F_3CPhOH+POCl_3 \rightarrow (F_3CPhO)_3PO+3HCl$$

The resulting product was then cooled and poured into one liter of 10% NaOH solution to neutralize any residual acid and also to separate out any unreacted tri-fluormethyl phenol, which is soluble in the sodium hydroxide solution. Moreover, the sodium hydroxide solution also separates out any mono- or di- substituted ester. This was shaken well and the oily layer separated out and washed twice with 100 ml. portions of 10% NaOH solution and then with distilled water until washings were neutral to litmus paper. The oily ester was then dissolved in benzene, decolorized with charcoal and dried over calcium chloride for 15 hours. It was then filtered and the benzene distilled under reduced pressure. This gave 98 grams of a light brown oily liquid which could not be distilled without decomposition under a reduced pressure as low as 14 mm. of Hg.

This new oily ester, tri-(m-trifluormethyl phenyl) phosphate, was found to have the following physical properties:

| | |
|---|---|
| Specific gravity 60/60° F. | 1.458 |
| Pour point | −35° F. (supercooled) |
| Melting point | +35° F. |
| Viscosity at 100° F. | 13.17 centistokes |
| Viscosity at 210° F. | 2.55 centistokes |
| Autogenous ignition temperature (glass) | above 1100° F. |

This product, tri-(m-trifluormethyl phenyl) phosphate, was found to have a surprisingly satisfactory combination of properties for use as a heat transfer fluid, functional or hydraulic fluid, or lubricant and at the same time an unusually high degree of fire resistance or nonflammability making it surprisingly useful as a relatively nonflammable or fire resistant hydraulic fluid and lubricant, or heat transfer fluid.

In the process given above, when meta-tri-fluormethyl phenol is available, it will be understood that the tri-(m-tri-fluormethyl phenyl) phosphate may be made by reacting the meta-trifluormethyl phenol directly with the POCl$_3$ as described above. Furthermore, in general, any of the tri-(trifluoralkyl phenyl) phosphates of our invention may be so made. This particularly includes the following such phosphates:

Tri-(ortho-trifluormethyl phenyl) phosphate
Tri-(meta-trifluormethyl phenyl) phosphate
Tri-(para-trifluormethyl phenyl) phosphate Tri-(ortho-2,2,2-trifluorethyl phenyl) phosphate
Tri-(meta-2,2,2-trifluorethyl phenyl) phosphate
Tri-(para-2,2,2-trifluorethyl phenyl) phosphate Tri-(ortho-3,3,3-trifluorpropyl phenyl) phosphate
Tri-(meta-3,3,3-trifluorpropyl phenyl) phosphate
Tri-(para-3,3,3-trifluorpropyl phenyl) phosphate Tri-(ortho-4,4,4-trifluorbutyl phenyl) phosphate
Tri-(meta-4,4,4-trifluorbutyl phenyl) phosphate
Tri-(para-4,4,4-trifluorbutyl phenyl) phosphate The above description and examples are intended to be illustrative only and not to limit the scope of the invention, and our invention extends to all modifications and variations which fall within the spirit and scope of the appended claims.

We claim:

1. A tri-(trifluoralkyl phenyl) phosphate in which the alkyl group has from one to four carbon atoms and the fluorine atoms are on the end carbon atom of the alkyl group.
2. A tri-(trifluormethyl phenyl) phosphate.
3. Tri-(ortho-trifluormethyl phenyl) phosphate.
4. Tri-(meta-trifluormethyl phenyl) phosphate.
5. Tri-(para-trifluormethyl phenyl) phosphate.
6. A tri-(2,2,2-trifluorethyl phenyl) phosphate.
7. Tri-(ortho-2,2,2-trifluorethyl phenyl) phosphate.
8. Tri-(meta-2,2,2-trifluorethyl phenyl) phosphate.
9. The process of producing a tri-(trifluoralkyl phenyl) phosphate which comprises diazotizing a tri-fluoralkyl aniline to a tri-fluoralkyl phenyl diazonium salt, hydrolizing said fluorinated diazonium salt to the corresponding fluorinated phenolic compound, and reacting said phenolic compound with phosphorus oxychloride to produce the tri-(trifluoralkyl phenyl) phosphate.
10. The process of producing a tri-(trifluoralkyl phenyl) phosphate which comprises reacting a trifluoralkyl phenol with phosphorus oxychloride to produce the tri-(trifluoralkyl phenyl) phosphate.
11. A process as defined in claim 9 in which the resulting product is washed with sodium hydroxide solution to neutralize residual acid, separate out unreacted fluorinated phenolic compound and mono- and di- substituted fluorinated esters, and then the oily fluorinated ester layer is separated, dissolved in benzene, decolorized and dried.
12. A process as defined in claim 10 in which the resulting product is washed with sodium hydroxide solution to neutralize residual acid, separate out unreacted fluorinated phenolic compound and mono- and di- substituted fluorinated esters, and then the oily fluorinated ester layer is separated, dissolved in benzene, decolorized and dried.

13. The process of producing tri-(meta-trifluormethyl phenyl) phosphate which comprises reacting meta-trifluormethyl phenol with phosphorus oxychloride to produce tri-(meta-trifluormethyl phenyl) phosphate.

14. The process of producing a tri-trifluormethyl phenyl) phosphate which comprises reacting a trifluormethyl phenol with phosphorus oxychloride to produce a tri-(trifluormethyl phenyl) phosphate.

15. The process of producing tri-(meta-2,2,2-trifluorethyl phenyl) phosphate which comprises reacting a meta-2,2,2-trifluorethyl phenol with phosphorus oxychloride to produce tri-(meta-2,2,2-trifluorethyl phenyl) phosphate.

16. The process of producing a tri-(2,2,2-trifluorethyl phenyl) phosphate which comprises reacting a 2,2,2-trifluorethyl phenol with phosphorus oxychloride to produce the tri-(2,2,2-trifluorethyl phenyl) phosphate.

References Cited in the file of this patent

UNITED STATES PATENTS

| Number | Name | Date |
|---|---|---|
| Re. 19,265 | Midgley et al. | Aug. 7, 1934 |
| 2,217,706 | Reid | Oct. 15, 1940 |
| 2,330,251 | Taylor | Sept. 28, 1943 |
| 2,340,331 | Knutson et al. | Feb. 1, 1944 |
| 2,358,133 | Stoesser | Sept. 12, 1944 |
| 2,373,807 | Beeg | Apr. 17, 1945 |
| 2,395,380 | Morgan | Feb. 19, 1946 |
| 2,566,623 | Moreton | Sept. 4, 1951 |
| 2,574,516 | Walter | Nov. 13, 1951 |

FOREIGN PATENTS

| Number | Country | Date |
|---|---|---|
| 3,053 | Great Britain | of 1914 |
| 455,014 | Great Britain | Oct. 12, 1936 |

OTHER REFERENCES

Chemical Abstracts, vol. 38, col. 1483 (1944) citing Brensch, Rev. faculte sci. univ. Istanbul 7A, 182–9 (1942) (in German).

Gilman, Organic Chemistry, vol. I (2d ed.—1946), pages 950–951.